United States Patent [19]

Leggett, deceased et al.

[11] Patent Number: 4,791,076

[45] Date of Patent: Dec. 13, 1988

[54] GRAPHITE FIBER REINFORCED SILICA MATRIX COMPOSITE

[75] Inventors: Hyman Leggett, deceased, late of Chatsworth, by Sally S. Leggett, Administrator; Kenneth M. Brown, Los Angeles, Calif.

[73] Assignee: Hughes Aircraft Company, Los Angeles, Calif.

[21] Appl. No.: 637,245

[22] Filed: Aug. 2, 1984

[51] Int. Cl.$^4$ ............................ C04B 35/02; G02B 5/08
[52] U.S. Cl. .................................... 501/95; 350/609; 350/610; 350/641; 501/53; 501/63; 501/88; 428/912.2
[58] Field of Search .......................... 350/609, 610, 641; 501/53, 63, 88, 95; 428/912.2

[56] References Cited

U.S. PATENT DOCUMENTS

| | | | |
|---|---|---|---|
| 2,920,971 | 1/1960 | Stookey et al. | 501/95 X |
| 4,084,974 | 4/1978 | Beall et al. | 501/63 X |
| 4,212,678 | 7/1980 | Chyung et al. | 501/63 X |
| 4,285,728 | 8/1981 | Babcock et al. | 501/63 X |
| 4,314,852 | 2/1982 | Brennan et al. | 501/88 |
| 4,410,635 | 10/1983 | Brennan et al. | 501/88 |
| 4,451,118 | 5/1984 | Stalcup et al. | 350/609 |
| 4,485,179 | 11/1984 | Brennan et al. | 501/88 X |

FOREIGN PATENT DOCUMENTS 0010400  8/1979  Japan ..................... 501/63

*Primary Examiner*—Stephen C. Buczinski
*Attorney, Agent, or Firm*—M. E. Lachman; A. W. Karambelas

[57] ABSTRACT

A graphite fiber reinforced silica matrix composite comprising a plurality of graphite fibers bonded together in a silica matrix comprised of silica, boron phosphate and beta-spodumene modified with a minor amount of an alkaline earth metal oxide is disclosed. The extremely low, nearly zero, coefficient of thermal expansion coupled with the moderate thermal conductivity and low density of the composite make the composite particularly suitable as a substrate material for high energy laser mirrors.

8 Claims, 1 Drawing Sheet

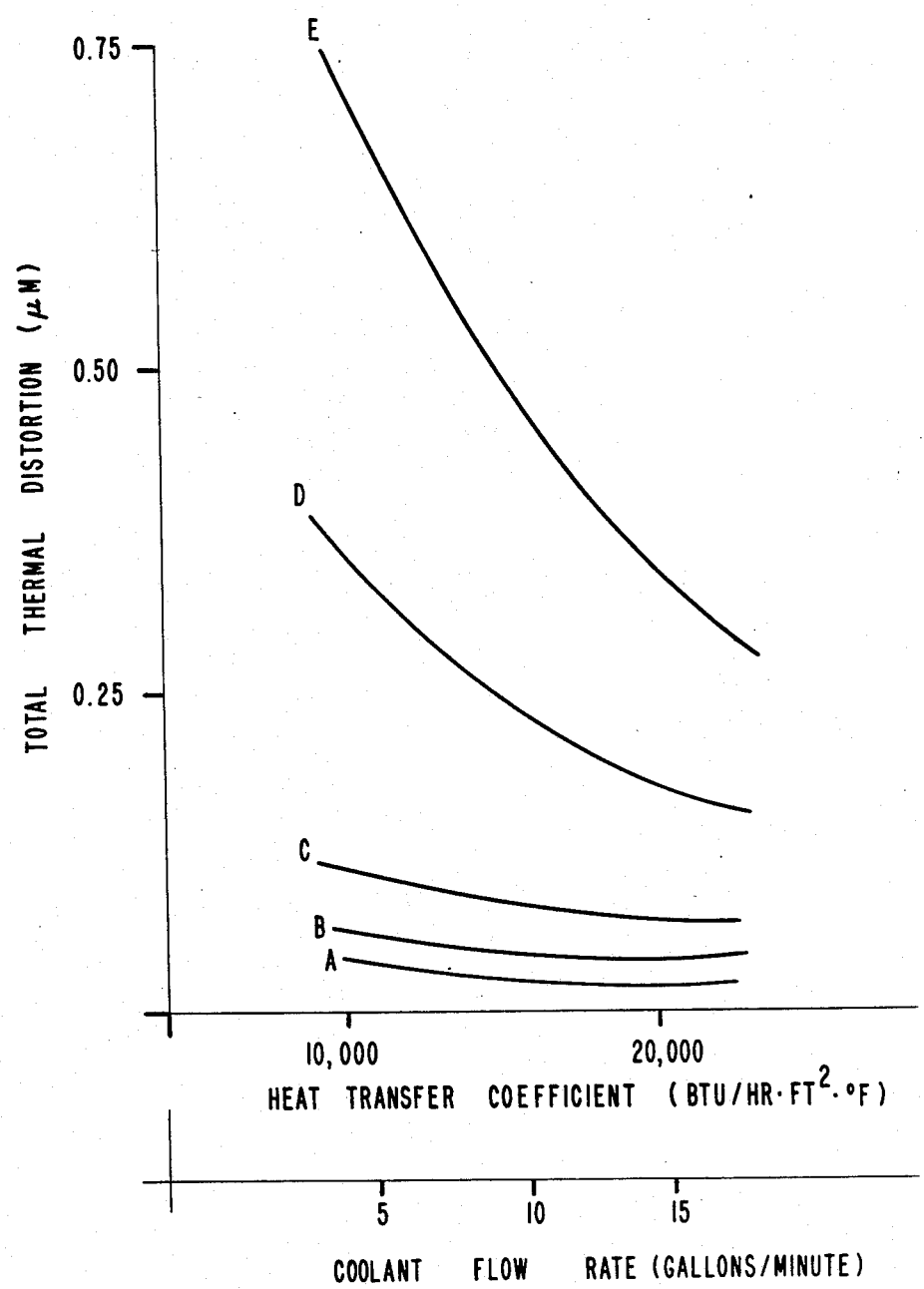

GRAPHITE FIBER REINFORCED SILICA MATRIX COMPOSITE

BACKGROUND OF THE INVENTION

1. Field of the Invention

This invention relates, generally, to reinforced silica composites and a method of making the same. More particularly, the invention relates to a graphite fiber reinforced silica composite having an extremely low thermal expansion coefficient and to articles fabricated from such composites, such as laser mirrors, which exhibit high temperature dimensional stability.

2. Description of the Related Art

The aerospace industry has long recognized the advantages of composite materials of construction, particularly those which exhibit superior physical properties, such as low density combined with high temperature dimensional stability. One of the most promising materials for use in composite construction is graphite fiber, such as high mechanical strength, high elastic modulus graphite fiber yarn. Although such graphite yarn has heretofore been used in the formation of useful structural composites, the need for composites having high temperature dimensional stability has continued to be unmet. This need is illustrated in the manufacture of high energy laser mirrors.

High energy lasers, such as powerful gas lasers, have an excited medium which provides the lasing action. Aligned with the excited medium is a pair of optical resonator mirrors between which light oscillations occur. Precision mirrors used as resonator mirrors are constructed of an inert substrate such as molybdenum or single crystal silicon upon the surface of which is applied a mirror coating having a high degree of radiation reflectivity. Effective laser action depends upon a buildup of energy by repeated reflection of radiation between the laser mirrors prior to escaping as a high energy coherent beam through one of the mirrors. In practice, imperfect alignment of the mirrors impairs the development or maintenance of the proper oscillation of the reflected radiation, which misalignment is frequently due to dimensional changes, i.e. distortion of the mirror optical surface, due to the large thermal energy absorbed at the surface during laser operation. Each mirror in the optical path which is used to transmit the laser beam is subject to the same distortion. Thus, it is necessary to minimize the distortion of all mirrors in a high energy laser system in order to reduce the distortion of the wavefront of the laser beam.

To prevent mirror distortion, complex heat exchangers are utilized in the mirror substrate to remove the absorbed energy and minimize distortion of the optical surface. Mirror distortion may also be reduced by employing a high heat transfer coefficient between the cooling medium and the heat exchanger passages in combination with or as an alternative to utilizing a substrate material which exhibits good thermal conductivity and an extremely low, near zero, coefficient of thermal expansion. For example, one major factor of laser mirror distortion may be expressed mathematically by the following equation:

Mirror distortion $$\propto Q/A \cdot \alpha \left( \frac{1}{h} + \frac{t}{k} \right)$$

where
Q/A=absorbed flux intensity
$\alpha$=mirror coefficient of thermal expansion
h=heat transfer coefficient
t=thickness between optical surface and coolant passages
k=mirror thermal conductivity By reference to the mathematical expression above, it can be seen that reduction of the coefficient of thermal expansion ($\alpha$) provides a greater reduction in mirror distortion than can be achieved by any practical increase in heat transfer coefficient (h) or increased thermal conductivity. The coefficient of thermal expansion plays an even greater role in the two remaining components of mirror distortion, namely heat exchanger bending strain and mirror support structure bowing.

Unalloyed molybdenum and single crystal silicon have been used as substrate materials for laser mirrors because of their relatively low coefficients of thermal expansion, e.g. $\alpha=2.7\times10^{-6}/°F$. and $\alpha=1.70\times10^{-6}/°F$. (from 20° C. to 150° C.) respectively, good thermal conductivity and high modulus of elasticity. However, the performance of molybdenum and single crystal silicon as substrate materials is limited by their fixed coefficient of thermal expansion and molybdenum is further limited by its relatively high density.

SUMMARY OF THE INVENTION

The present invention is directed to a graphite fiber reinforced silica matrix composite having a coefficient of thermal expansion/density ratio which is more favorable than that of molybdenum or fused single crystal silicon, making such a composite particularly useful as a substrate material for the manufacture of high energy laser mirrors. These composites are formed from a plurality of graphite fibers bonded in a matrix comprised of a mixture of silica, boron phosphate and a modified beta-spodumene. By varying the constituents of the matrix, the coefficient of thermal expansion ($\alpha$) can be varied over a given range, e.g. $+0.55\times10^{-6}/°F$. to $-0.55\times10^{-6}/°F$. within a density range of 1.8 to 2.5 g/cm$^3$, making the present composite particularly useful as a substrate material for high energy laser mirrors.

BRIEF DESCRIPTION OF THE DRAWING

The FIGURE is a graphical illustration of the relationship between the thermal distortion and the heat transfer coefficient of similar mirror substrates constructed from composites of the present invention, as well as for other known molybdenum and single crystal silicon substrates.

DETAILED DESCRIPTION OF THE INVENTION

The term "graphite fiber" is intended to include any of the fibers that are made by carbonizing organic fibers such as cellulose fibers, viscose rayon, polyacrylonitrile, acrylic synthetic fibers, polyvinyl alcohol synthetic fibers, and others wherein the fiber is composed of almost pure carbon, i.e. contains more than 98 percent carbon. The fibers used in the composite of the present invention comprise graphite fibers which are woven (aggregated or bundled) together and are all oriented in the same direction forming a unidirectional yarn.

The graphite fibers used to prepare the composites of the present invention have a diameter of about 8 to 11 micrometers, a high strength, and a high modulus of elasticity. The preferred graphite fiber is GY-70 available from the Celanese Company. This product is specifically available in the form of graphite fibers woven into unidirectionally oriented yarn bundles. The yarn has an elastic modulus of about 75 million pounds per square inch (psi) and an average tensile strength of about 270,000 psi. The yarn represents about 9 to about 15 percent by volume of the composite. At this percent volume range, the weight concentration of the fiber in the composite generally ranges from about 9.3 to about 15.4 weight percent, and preferably from about 12 to about 14 percent.

The silica component used to prepare the composite is in the form of a powder of 5 to 44 micrometers particle size. The silica represents about 50 to about 75 volume percent of the graphite fiber reinforced composite and preferably about 60 to about 70 volume percent. At this percent volume range, the weight concentration of the silica powder in the composite generally ranges from about 59 to about 69 percent by weight of the composite, and preferably about 62 to about 66 percent by weight.

The boron phosphate used to prepare the present composite is in the form of a powder of 5 to 44 micrometers particle size. The boron phosphate represents about 5 to about 10 volume percent of the reinforced composite, and preferably about 7 to about 9 volume percent. At this percent volume range, the weight percent of boron phosphate powder ranges from about 4.5 to about 9.5 percent by weight, and preferably about 6.5 to about 8.5 percent by weight.

Spodumene is lithium aluminum silicate, $LiAl_2Si_2O_6$. Natural spodumene is a monoclinic silicate with a density of 3.15 g/cm$^3$. On heating to about 1000°–1100° C., natural $\beta$-spodumene undergoes an irreversible phase change to tetragonal $\beta$-spodumene with a density of 2.4 g/cm$^3$. During the bonding step described hereinafter, a temperature in excess of 1000° C. is used and the conversion of the $\beta$-spodumene to the tetragonal form occurs. The $\beta$-spodumene used to prepare the present composite is in the form of a powder of 5 to 44 micrometers particle size. The $\beta$-spodumene represents about 6 to about 15 volume percent of the reinforced composite, and preferably about 7 to about 9 volume percent. At this percent volume range, the weight percent of $\beta$-spodumene ranges from about 9 to about 11 percent by weight of the composite, and preferably about 9.5 to about 11 percent by weight.

The term "modified" $\beta$-spodumene as used herein means $\beta$-spodumene modified by the addition of alkaline earth oxides, such as magnesium oxide, calcium oxide, and barium oxide, in amounts ranging from about 0.09 to about 0.15 molecular equivalents, and preferably about 0.10 to about 0.12 molecular equivalents or about 5 to about 6 percent by weight based on the weight of the modified $\beta$-spodumene.

The modified $\beta$-spodumene exhibits a negative coefficient of expansion, so that when heated to temperatures of 700° C. or more, the modified mineral undergoes contraction. The changes which the modified $\beta$-spodumene undergoes when heated at 700° C. or more may be represented by the following formula:

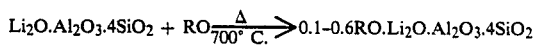

wherein R is an alkaline earth metal such as barium, calcium or magnesium.

Typical compositions of alkaline earth oxide modified $\beta$-spodumene compounds useful in the practice of the present invention are shown in Table I below.

TABLE I

| | MODIFIED BETA-SPODUMENE COMPOSITIONS | | | | | | | | |
|---|---|---|---|---|---|---|---|---|---|
| | Composition No. | | | | | | | | |
| | Molecular Equivalents | | | Mole % | | | Wt. % | | |
| Oxides | 1 | 2 | 3 | 1 | 2 | 3 | 1 | 2 | 3 |
| LiO$_2$ | 0.917 | 0.917 | 0.870 | 16.41 | 16.41 | 16.27 | 7.95 | 7.92 | 7.57 |
| MgO | 0.083 | — | — | 1.49 | — | — | 0.98 | — | — |
| CaO | — | 0.083 | — | — | 1.49 | — | — | 1.34 | — |
| BaO | — | — | 0.130 | — | — | 2.43 | — | — | 5.80 |
| Total | 1.000 | 1.000 | 1.000 | — | — | — | — | — | — |
| Al$_2$O$_3$ | 0.917 | 0.917 | 0.870 | 16.41 | 16.41 | 16.27 | 27.12 | 27.02 | 25.82 |
| SiO$_2$ | 3.670 | 3.670 | 3.478 | 65.59 | 65.69 | 65.03 | 63.95 | 63.72 | 60.81 |
| Total | — | — | — | 100.00 | 100.00 | 100.00 | 100.00 | 100.00 | 100.00 |

The novel graphite fiber reinforced silica composites of the present invention may be prepared as follows. The graphite yarn is cut into segments of workable length, such as 2–3 inches (5.08 to 7.62 cm). The graphite fibers are arranged side by side in a uniaxial direction within a flat metal box or mold. The silica, boron phosphate and modified $\beta$-spodumene are mixed together with a sufficient amount of an inert liquid such as water, xylene, or an alcohol to form a slurry of the inorganic materials, and the slurry is flowed onto the fiber arrangement, to give a ratio of fibers to inorganic matrix ranging from, by volume, about 12% of fibers and about 88% of mineral matrix to about 15% of fibers and about 75% of mineral matrix, preferably 13 to 14% fiber and 87 to 86% mineral matrix. The liquid is removed from the impregnated yarn, to produce a flat sheet product. Then, a number of sheets of impregnated yarn are stacked one atop another and the stack is bonded, such as by hot-pressing in a non-oxidizing or reducing atmosphere. In one hot pressing procedure, the graphite fiber yarn is bonded to the mineral matrix by heating sheets of the impregnated yarn for about 2 hours at 1200° to 1300° C. and 1600 to 15,000 psi in a non-oxidizing (argon or nitrogen gas) atmosphere. Alternatively, the mineral matrix can be bonded to the graphite fiber yarn by cold pressing the mineral matrix constituents with the graphite fiber yarn to form a mat and then sintering the composite mat at 1300° to 1350° C. in a vacuum or a reducing or non-oxidizing atmosphere. As a second alternative, the mineral matrix can be combined with the graphite fiber yarn using slip-casting by conventional ceramic art methods to form a mat which is then sintered in a vacuum or a reducing or non-oxidizing atmosphere. It should be noted that at the temperatures used for bonding the yarn to the mineral matrix, the β-spodumene is converted to the tetragonal form which has a lower density and lower coefficient of thermal expansion than the monoclinic form.

The thermal properties of the composites of the present invention having the compositions shown in Table I are shown in the FIGURE, along with comparative data for molybdenum and single crystal silicon mirror substrate materials. The FIGURE presents data for thermal distortion versus flow rate of coolant. It is desirable to have a material which has a low thermal distortion in the mirror substrate in order to minimize mirror distortion, as previously discussed. It is further desirable to have a material which requires a low coolant flow rate, particularly for airborne and spaceborne laser systems where cooling system weight and pumping power requirements represent a significant portion of the allowable weight for the system. Moreover, a reduction in coolant flow rate reduces the flow-induced vibration of the mirror which is a major source of optical pointing error in complex high energy laser systems. A low coolant flow rate, in turn, is possible if the substrate material has a low coefficient of thermal expansion and therefore does not require a high heat transfer coefficient in order to minimize mirror distortion.

Turning now to the FIGURE, Curves A, B, and C present data for composites of the present invention having compositions 1, 2, and 3 respectively, shown in Table I. It can be seen in the FIGURE that the composite of composition 1 provides the lowest total thermal distortion while requiring the lowest heat transfer coefficient and coolant flow rate. Thus, for a given low coolant flow rate, the composite of composition 1 provides the lowest thermal distortion. In addition, Curves D and E of the FIGURE present data for substrates of single crystal silicon and molybdenum, respectively. By comparing Curves A, B, and C with Curves D and E, it can readily be seen that the composites of the present invention have significantly lower thermal distortion than known materials, at any value of the heat transfer coefficient (and any coolant flow rate) and most notably at a relatively low value of heat transfer coefficient (and low coolant flow rate). Further, even at the higher values of heat transfer coefficient (and higher coolant flow rates), the composites of the present invention have improved thermal properties compared to the previously known materials. Consequently, the composites of the present invention can advantageously be used as mirror substrates which require low coolant flow rates and remain relatively insensitive to thermal distortion during operation of the laser system in which they are incorporated.

In generating the data for the FIGURE, the equation describing mirror distortion as previously discussed herein was used. For a given material, for various given values of h (heat transfer coefficient), the appropriate values for α (coefficient of thermal expansion) and k (thermal conductivity) for that material were substituted to derive the total mirror distortion, and the values were plotted into curves as shown in the FIGURE.

The graphite fiber reinforced silica matrix composite of the present invention has an extremely low coefficient of thermal expansion and is thus relatively insensitive to thermal distortion while possessing the desirable structural properties of low density and good thermal conductivity. Because of these enumerated physical properties, the graphite fiber reinforced silica matrix composite may be effectively fabricated into structural forms to be used in high energy laser applications. Thus the composites of the present invention are especially useful as substrates for high energy laser mirrors. Such mirrors can be produced by forming the composite of the present invention into the shape required for a mirror by known molding and shaping procedures, and then providing a reflecting surface on one face of the composite. Multilayer dielectric coatings and standard metallic coatings have long been used in lasers and for other applications because of their high reflectivity. Commonly, such mirrors have included a substrate of unalloyed molybdenum or single crystal silicon. Some typical dielectric mirror coating materials include titanium dioxide, zirconium dioxide, magnesium fluoride and thorium fluoride. The mirrors are made by evaporating onto the substrate in alternating layers, a dielectric layer with a high index of refraction and one with a low index of refraction. Each layer has an optical thickness (the product of physical thickness and index of refraction) equal to one-quarter of the wavelength at which the reflecting surface will be used. Proper choice of indexes of refraction and numbers of layers allows the production of a mirror with nearly any desired reflectivity. These and other known materials may be used to provide a reflecting surface on the composite of the present invention to form a laser mirror.

In fabricating high energy laser mirrors, the substrate must have an acceptable coefficient of thermal expansion at the temperature at which the optical coating is applied to the substrate, which is typically about 150° C. Using the graphite fiber reinforced silica matrix composite of the present invention, a typical composition formulated to obtain zero expansion at 150° C. is as follows:

|  | Parts by Weight | Volume Percent |
| --- | --- | --- |
| $SiO_2$ | 68.3 | 69.7 |
| $BPO_4$ | 7.6 | 7.9 |
| Graphite Yarn | 13.7 | 13.6 |
| Modified β-spodumene | 10.4 | 8.8 |

Between room temperature and 150° C., the volume changes which occur in each of the constituents used to prepare the graphite fiber reinforced silica matrix composite of the present invention are as follows:

|  | Volume Change % |
| --- | --- |
| $SiO_2$ | +0.0093 |
| $BPO_4$ | +0.094 |
| Graphite | +0.022 |
| Modified β-spodumene | −0.19 |

The following Examples are illustrative of the invention but are not intended to limit the scope of the invention, which is defined in the appended claims.

EXAMPLE 1

A graphite fiber reinforced modified silica matrix composite sheet was prepared using 13.7% by weight GY-70 graphite fiber yarns which had been chemically vapor deposited with a coating of silicon carbide to ensure chemical compatibility of the composite components. The yarns had been cut into segments having a length of about 2.75 inches (7.0 cm), and the fibers were arranged side by side in a uniaxial direction in a metal box. The fibers had the following physical properties:

| Fiber yarn diameter | 8.4 micrometers |
|---|---|
| Modulus of elasticity | $70 \times 10^6$ psi |
| Coefficient of expansion | $+8 \times 10^{-6}/°$ F. transverse |
| | $-0.67 \times 10^{-6}/°$ F. longitudinal |

The fiber yarn was impregnated with an aqueous slurry containing the following mineral constituents:

| Component | Solid content of the slurry (weight %) |
|---|---|
| SiO$_2$ (derived from Brazilian quartzite) | 79 |
| BPO$_4$ | 9 |
| Modified $\beta$-spodumene | 12 |

The oxide composition of the modified $\beta$-spodumene was as follows:

| Oxide Component | Equivalents | Weight Percent |
|---|---|---|
| LiO$_2$ | 0.870 | 7.57 |
| Al$_2$O$_3$ | 0.870 | 25.82 |
| SiO$_2$ | 3.478 | 60.81 |
| Alkaline Earth Oxide (BaO) | 0.130 | 5.80 |

The impregnated graphite yarn was dried by exposure to hot air sufficient to remove the liquid medium. The resulting impregnated fiber yarn sheets were stacked in a die assembly for consolidation at an elevated temperature in a manner so that the yarns were aligned in a direction colinear with the original uniaxial orientation of the fibers. Hot pressing consolidation was performed at 1250° C., at a pressure of about 1600 psi in a resistance or induction heated furnace employing a reducing or non-oxidizing atmosphere (inert nitrogen or argon). The resulting composite contained 13.6% by volume graphite fibers. The fused compressed composite had a thickness of 1.27 centimeters.

The composite product was determined to have a coefficient of thermal expansion of $+0.18 \times 10^{-6}/°$F.

The thermal conductivity of the composite with the graphite yarn aligned parallel to the direction of heat flow was calculated using the following equation:

$$Km = V_1 K_1 + V_2 K_2$$

where
K = thermal conductivity
V = volume expressed as % and
m, 1 and 2 refer, respectively, to the composite, the graphite fiber phase and the modified silica matrix phase.

The thermal conductivity of the graphite fiber yarn used to prepare the present composite was reported by the Celanese Company to be 120 BTU/ft·hr·°F. (0.492 cal/cm·sec·°C.). The thermal conductivity of the modified silica matrix was determined to be 0.8 BTU/ft·hr·°F. (0.003 cal/cm·sec·°C.). Using the equation noted above, the thermal conductivity of the composite of the present invention was calculated to be approximately 11.3. BTU/ft·hr·°F. (0.046 cal/cm·sec·°C.).

In addition, a graphite fiber reinforced silica matrix composite was prepared in the same manner as described above with the exceptions that the graphite yarn was present in the composite at 22 weight percent and the modified $\beta$-spodumene was absent from the silica matrix. The latter composite had the following physical properties:

Coefficient of thermal expansion = $0.09 \times 10^{-6}/°$F.
Thermal conductivity = 18.8 BTU·ft·hr·°F., (0.077 cal/cm·sec·°C.)

Thus, it can be seen that the thermal conductivity of the composites of the present invention can be controlled by varying the amounts of the components in the composition, while maintaining a low coefficient of thermal expansion.

While specific components of the present system are defined in the working examples above, many other variables may be introduced which may in any way affect, enhance or otherwise improve the present invention. These are intended to be included herein.

Although variations are shown in the present application, many modifications and ramifications may occur to those skilled in the art upon reading the present disclosure. These, too, are intended to be included herein.

We claim:

1. A graphite fiber reinforced silica matrix composite article characterized by a relatively low thermal distortion comprising:
   (a) unidirectionally oriented yarn bundles of graphite fibers bonded together in (b) a silica matrix comprising predominantly silica, mixed with boron phosphate and $\beta$-spodumene modified by the addition of about 5 to about 6 percent by weight of an alkaline earth oxide based on the weight of the modified said $\beta$-spodumene.

2. The article of claim 1 wherein the graphite fibers comprise about 9 to about 15 percent by volume of the composite.

3. The article of claim 1 wherein the silica comprises about 50 to about 75 percent by volume of the composite.

4. The article of claim 1 wherein the boron phosphate comprises about 5 to about 10 percent by volume of the composite.

5. The article of claim 1 wherein the modified $\beta$-spodumene comprises about 6 to about 15 percent by volume of the composite.

6. The article of claim 1 wherein the alkaline earth oxide is selected from the group consisting of magnesium oxide, calcium oxide and barium oxide.

7. The composite of claim 1 wherein:
   (a) said graphite fibers are present in the amount of about 13.7 parts by weight;
   (b) said silica is present in the amount of about 68.3 parts by weight;
   (c) said boron phosphate is present in the amount of about 7.6 parts by weight; and
   (d) said modified $\beta$-spodumene is present in the amount of about 10.4 parts by weight.

8. The graphite fiber reinforced silica matrix composite article of claim 1 wherein at least one side of said substrate has deposited thereon a layer of a chosen material capable of reflecting radiation of a predetermined wavelength.

* * * * *